United States Patent [19]

Fisher

[11] Patent Number: 5,575,605

[45] Date of Patent: Nov. 19, 1996

[54] ELEVATABLE SHOPPING CART

[76] Inventor: Herbert H. Fisher, 1910 N.E. 207th St., North Miami Beach, Fla. 33179

[21] Appl. No.: 546,013

[22] Filed: Oct. 20, 1995

Related U.S. Application Data

[63] Continuation of Ser. No. 206,326, Mar. 7, 1994, abandoned.

[51] Int. Cl.⁶ ........................................................ B62B 1/12
[52] U.S. Cl. ............................ 414/490; 280/47.29; 280/652
[58] Field of Search ...................... 414/490; 280/47.29, 280/47.33, 152

[56] References Cited

U.S. PATENT DOCUMENTS

| | | | |
|---|---|---|---|
| 2,371,472 | 3/1945 | Ruff et al. | 280/652 |
| 2,598,489 | 5/1952 | Bayer et al. | 280/47.33 X |
| 2,854,245 | 9/1958 | Manahan | 280/47.29 |
| 3,043,603 | 7/1962 | Major, Sr. | 280/47.29 X |
| 3,763,965 | 10/1973 | Riekkinen | 280/47.29 X |
| 3,907,138 | 9/1975 | Rhodes | 414/490 X |
| 4,185,848 | 1/1980 | Holtz | 280/652 |
| 4,726,602 | 2/1988 | Sanders et al. | 280/47.29 X |
| 5,122,027 | 6/1992 | Tabayashi | 414/490 X |
| 5,127,664 | 7/1992 | Cheng | 280/47.29 X |
| 5,251,922 | 10/1993 | Mann | 414/490 X |

FOREIGN PATENT DOCUMENTS

| | | | |
|---|---|---|---|
| 194781 | 4/1957 | Austria | 414/490 |
| 276380 | 10/1964 | Netherlands | 280/652 |
| 2269806 | 2/1994 | United Kingdom | 414/490 |

*Primary Examiner*—David A. Bucci
*Attorney, Agent, or Firm*—Arthur G. Yeager

[57] ABSTRACT

A collapsible, wheeled shopping cart having a horizontal shelf which is vertically movable for easy loading and/or unloading, and having a surrounding skirt that is hinged so as to be collapsible when not in use. The movable shelf may be automatic and movable upwardly when the load on the shelf is decreased or is selectively movable upwardly by a hand crank of a threaded jack or by a piston and cylinder assembly powered by a source of compressed fluid.

16 Claims, 3 Drawing Sheets

ELEVATABLE SHOPPING CART

This is a continuation of application Ser. No. 08/206,326 filed on Mar. 7, 1994, now abandoned.

BACKGROUND OF THE INVENTION

Wheeled carts are used everywhere for the convenience of a shopper in a large mall or in a small store where several items may be purchased by a customer and taken to a checkout counter or to an exit and on to a personal automobile for transportaion elsewhere. Customer carts have typically been made of wire frames, riding on four wheels, and being somewhat nestable. Other carts are owned by the customer and are brought from home to the shop and back home again. These carts, in order to be as easily transportable as possible, are usually two-wheeled carts having a collapsible/expandable frame. There are no such collapsible carts on the market today that are specifically designed to ease the problem of loading and unloading by one whose back is weak.

It is an object of this invention to provide a shopping cart that eliminates the need for the user to bend his or her back too much in loading or unloading the cart. It is a specific object of this invention to provide an improved cart that has an elevatable shelf for holding shopping packages. Still other objects will become apparent from the more detailed description which follows.

BRIEF SUMMARY OF THE INVENTION

This invention relates to a wheeled, preferably collapsible, shopping cart having an elongated vertical tubular support housing concentrically surrounding an elongated vertical rod both having a common vertical axis, the rod being movable within the housing. The rod has affixed to it a horizontal shelf capable of vertical movement with respect to the housing. The shelf is hinged to be collapsible against the housing, and there is a four-sided rectangular skirt which also is hinged so as to be inwardly collapsible against the housing and the collapsed shelf.

In specific embodiments of the invention the shelf is moved vertically by moving the rod vertically by springs or by fluid means. The shelf also is movable vertically by threading the rod and a threaded collar to which the shelf is attached so that the rod may be turned causing the collar and shelf to move vertically along the threaded rod.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 2:
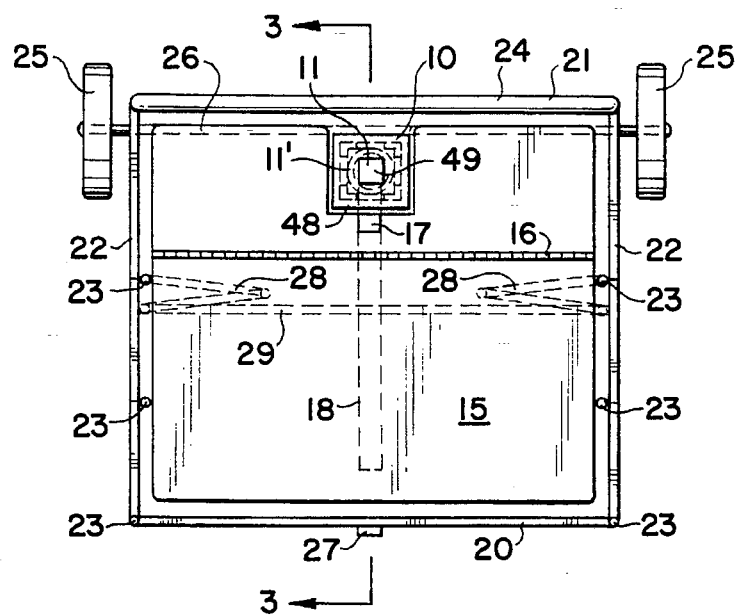
FIG. 2 is a top plan view of the shopping cart of FIG. 1.
Figure 1:
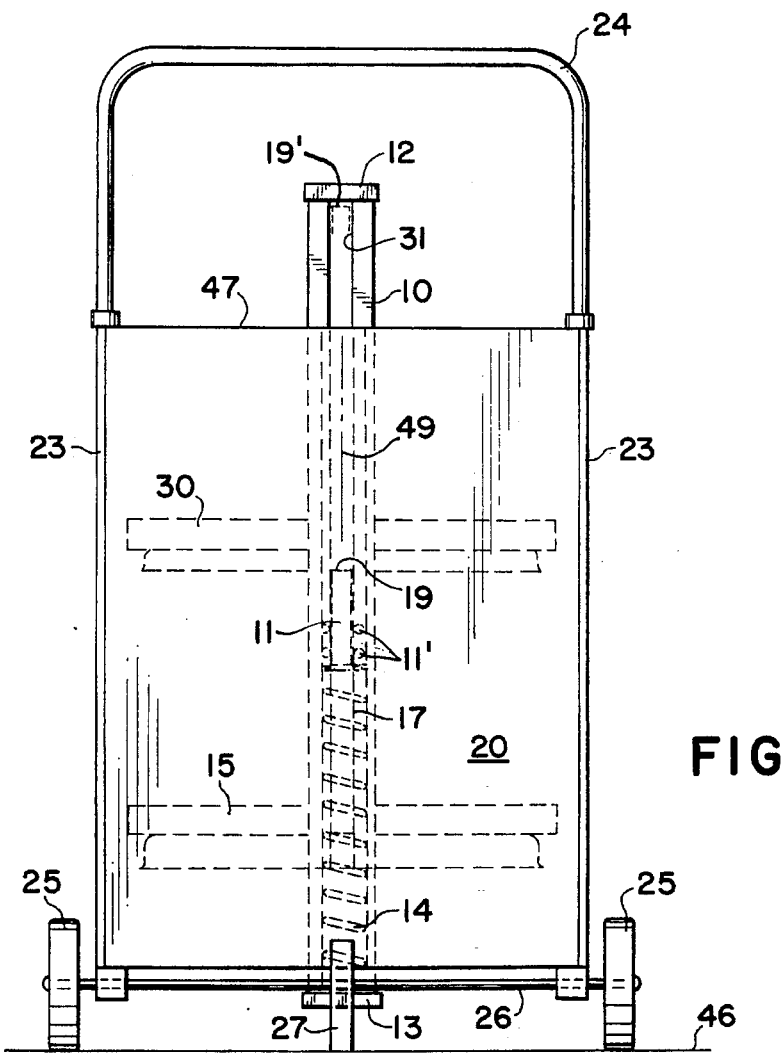
FIG. 1 is a front elevational view of one embodiment of the shopping cart of this invention.
Figure 3:
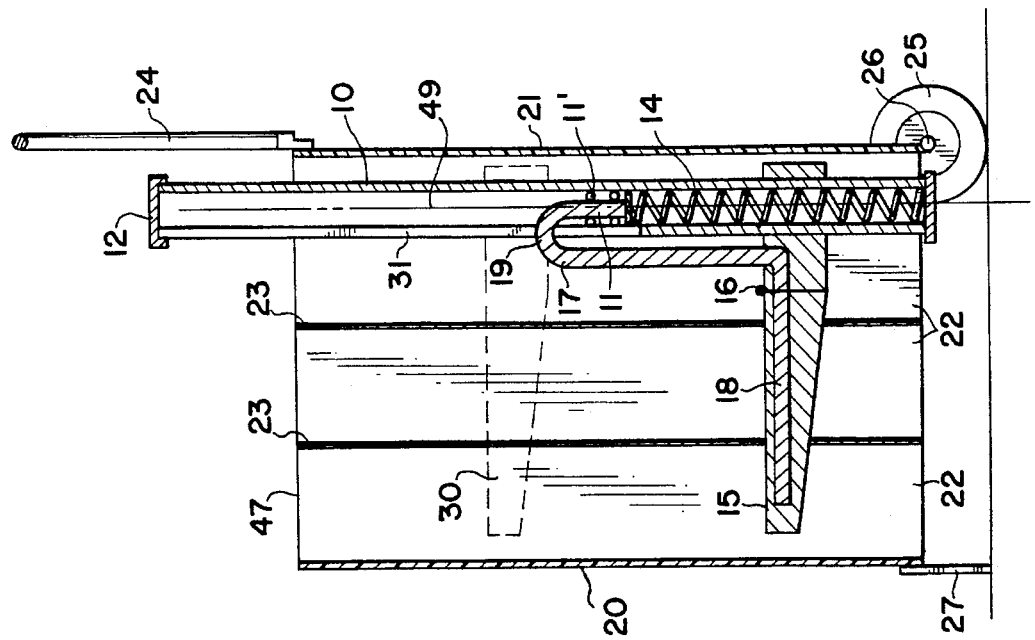
FIG. 3 is a cross-sectional view of the shopping cart taken at 3—3 of FIG. 2.

The features of this invention are best understood by reference to the attached drawings. FIGS. 1–3 show the general structural features of the shopping cart.

The shopping cart as shown in FIGS. 1–3 has a rectangular body surrounding an elevatable shelf upon which shopping packages can be loaded. Shelf 15 is attached to a vertical rod 11 having bearings 11' mounted thereto and encased concentrically in an elongated tubular housing 10 having a bottom closure 13. The cart has four vertical walls of thin sheet material, preferably stiff plastic or metal. The walls include front wall 20, rear wall 21, and two side walls 22 arranged into a rectangular tube with an open top and an open bottom. Walls 20 and 22 are joined to each other by hinges 23 at each of the two outer corners; and side walls 22 are divided into a plurality of portions joined to adjacent portions by hinges 23. Preferably, these hinges are elongated like piano hinges. The hinged arrangement permits the walls 20 and 22 to be collapsed in the fashion of a bifold door upon the housing 10 as generally shown in dotted lines at 28 in FIG. 2. Shelf 15 is also hinged at 16 so as to fold upward against housing 10 before walls 20 and 22 are collapsed.

Two wheels 25 are attached to housing 10 on shaft 26, and at least one leg rest 27 is attached to front wall 20 to permit the cart to stand upright. Handle 24 is attached to housing 10 at the upper end of the cart to provide a means for the user to push or pull the cart.

In the embodiment of FIGS. 1–3, the elevation force is supplied by a coil spring 14 inside housing 10 and biased against the bottom of rod 11. This embodiment is believed to be the simplest, the least expensive and the most preferred of all designs. When there is no load on spring 14, shelf 15 is at its most elevated position shown by broken lines 30, perhaps ten inches below the top level 47 of walls 20, 21 and 22. As shopping packages are loaded onto shelf 15 it moves downward according to the weight of shopping packages. As more and more weight is loaded onto shelf 15, it is depressed to a lower level, the maximum level being below that shown in solid lines in FIGS. 1 and 3 which is perhaps thirty inches below top edge 47. Shelf 15 is connected to rod 11 by way of parallel support rod 17, having a lower arm 18 which furnishes support for shelf 15, and a short upper arm 19 connecting rod 17 to internal rod 11. As rod 11 moves up and down, parallel rod 17 moves up and down carrying shelf 15 along with it. At the upper extremity 30 of shelf 15 movement, arm 19 will be adjacent cap 12 as shown in broken lines 19' in FIG. 1. It may be seen more clearly in FIG. 2 that housing 10 has an elongated vertical slot 31 with upper arm 19 extending therethrough and rod 11 is positioned inwardly of housing 10 within the cart structure so as to leave rear wall 21 flat. Shelf 15 has a cut out area 48 to accommodate housing 10 while shelf area extends outwardly in three directions from cut out area 48 to substantially fill the inner perimeter of the cart between walls 20, 21 and 22.

As shown in FIGS. 1–3 rod 11 is a square member with suitable spaced sets of cylindrical bearings 11', two vertically spaced sets being depicted, for maintaining the rod 11 freely movable within housing 10 and to inhibit any contact between shelf 15 and the walls 20, 21 and 22 of the cart.

While a round housing 10 and round rod 15 may be used with roller bearings 11', some provision would then be necessary between the slot 31 and upper arm 19 to provide sliding engagement with minimal friction so that the round rod would not rotate sufficiently to cause contact between the shelf 15 and the walls 20, 21 and 22.

Figure 4:
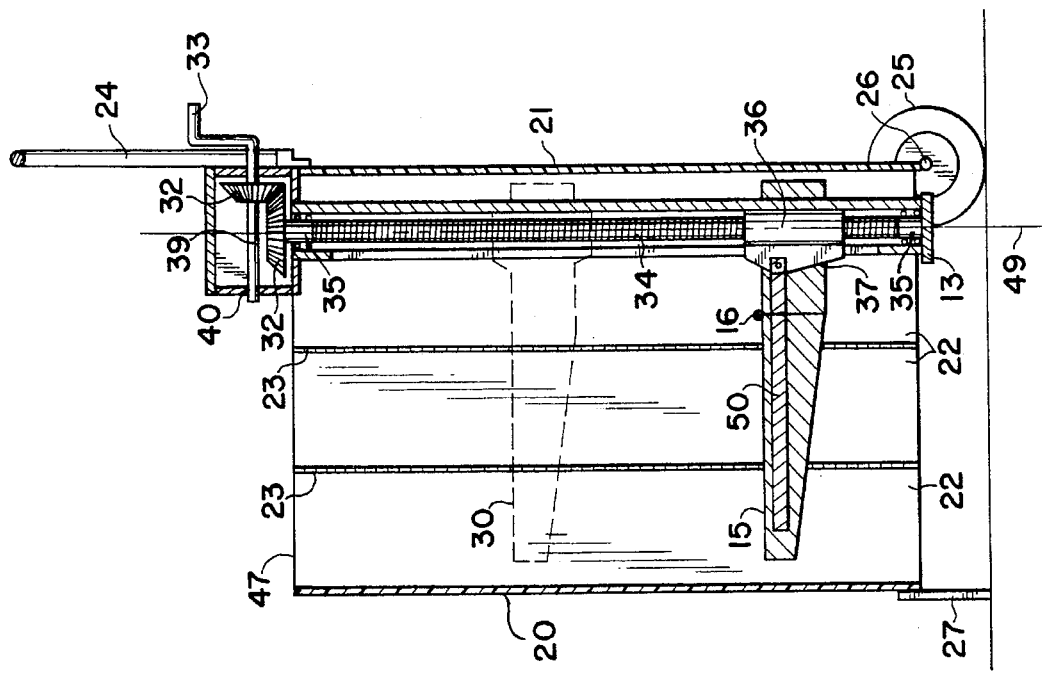
FIG. 4 is a cross-sectional view identical to that of FIG. 3 of a second embodiment wherein the shelf is moved by the turning of a threaded rod.

In FIG. 4 a second embodiment of the invention is shown with the elevating force being applied to shelf 15 by means of screw threads similar to a jack. Rod 34 is concentrically located within housing 10 and is fixed in its vertical position by upper and lower bearings 35 such that rod 34 may turn or rotate about central axis 49. A collar 36 is internally threaded and engaged with the external threads on rod 34, such that as rod 34 is rotated, collar 36 will move vertically upwardly or downwardly with respect to housing 10 and rod 34. Shelf 15 is affixed to arm 50 for support, and arm 50 is attached to collar 36 by member 37. At the upper end of rod 34 there are two miter gears 32, one of which is connected to shaft 39 which is supported for rotation in yoke 40, and is rotated by turning handle 33.

Figure 5:
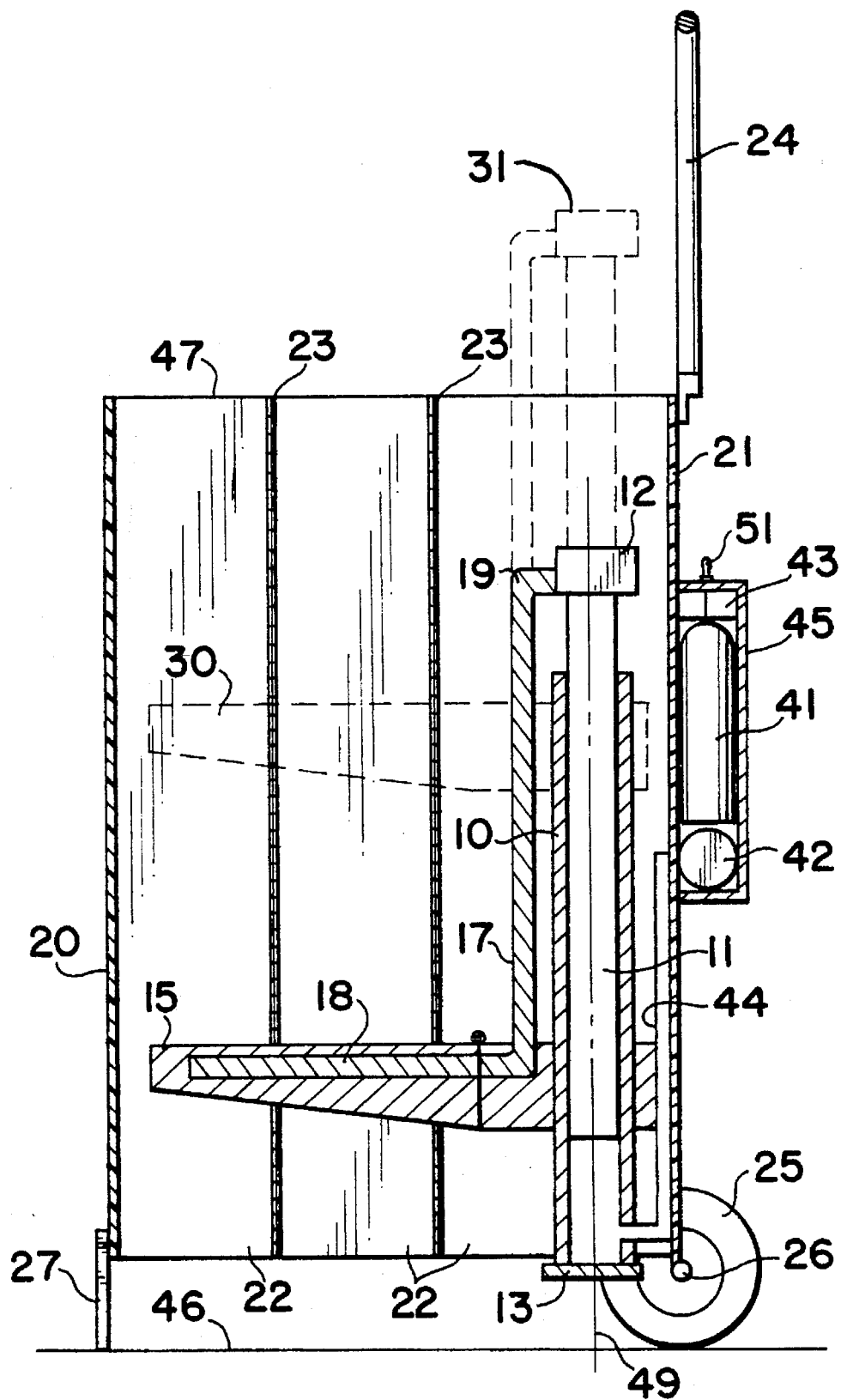
FIG. 5 is a cross-sectional view identical to that of FIGS. 3 and 4 of a third embodiment wherein the shelf is moved by an hydraulic or pneumatic force being applied to the bottom of a vertical rod.

In FIG. 5 a third embodiment is depicted with the elevating being supplied by means of a fluid applied to the lower solid surface of rod 11 causing it to move up and down lengthwise along axis 49 of housing 10 in the manner of a piston within a cylinder. The fluid may be liquid such as in a hydraulic system or gaseous such as a pneumatic system. The additional features of this embodiment include a case 45 mounted on rear wall 21 or otherwise on housing 10. Case 45 contains a tank 41 of the propelling fluid (oil or air, preferably), a pump 42, rechargeable batteries 43, and a switch 51 for turning the pump on or off. There may be other controls as needed. This embodiment will, of course, allow shelf 15 to move from a lower level, as shown in solid lines in FIG. 5, to an upper level as shown by broken lines 30. All other features of the cart are the same as those of FIGS. 1–3 described above.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A wheeled collapsible shopping cart comprising an elongated vertical tubular support housing having a narrow vertical slot facing inwardly of said cart, a vertical rod movable concentrically within said housing with respect to a common vertical axis of said housing and said rod, a narrow support member passing through said vertical slot and being carried by said vertical rod, a horizontal shelf being supported by said support member and selectively movable vertically therewith, said shelf being solid to support a load placeable thereon, horizontal pivot means located spacedly inwardly of said support member for selectively folding a front portion of said shelf along a horizontal axis to dispose said front portion in a generally vertical plane, a vertical skirt having a back wall and a pair of collapsible side walls encircling and spaced outwardly from said housing and said shelf, at least two freely rotatable wheels supporting said cart, and a handle extending above said skirt for guiding said cart.

2. The cart of claim 1 wherein said rod slides vertically within said housing, a fluid power means for controlling the introduction of fluid into and withdrawal of fluid from said housing to cause said rod to selectively be raised and lowered.

3. The cart of claim 1 further comprises a coil spring contained in said housing below said rod, said spring being arranged and adapted to maintain said shelf spacedly below an open top of said skirt when no load is being carried by said shelf, and to allow said shelf to be positioned adjacent a bottom of said skirt when said shelf is loaded with a predetermined load.

4. The cart of claim 1 wherein said rod is threaded, a threaded collar engages said threaded rod, said collar being attached to said support member, and a gear means for rotating said rod about its vertical axis within said housing.

5. The cart of claim 4 further comprising a hand crank for selectively rotating said gear means.

6. The cart of claim 1 wherein said skirt includes a plurality of spaced vertical hinges for inwardly collapsing said skirt, hinge means for folding said shelf against said housing along a horizontal axis.

7. The cart of claim 1 further comprising power means for moving said shelf between a position adjacent a bottom of said skirt to a position spaced below a top of said skirt.

8. A wheeled shopping cart comprising an elongated vertical tubular support housing having a length, an elongated vertical rod having an upper and lower extremity and being movable concentrically within said housing with respect to a common vertical axis of said housing and said rod, an elongated narrow support member having opposite end portions, one said end portion being connected to said vertical rod, said housing having an elongated narrow vertical slot extending substantially parallel with said common vertical axis and generally along said length of said housing, said support member extending through said slot adjacent said one end portion of said support member with another of said end portion being connected to said shelf and generally parallel to said axis and affixed to said vertical rod adjacent said upper extremity of said vertical rod, a horizontal solid bottom shelf being supported by said rod and which selectively moves vertically with movement of said rod, said support member being affixed to said shelf adjacent said lower extremity, an elongated solid vertical skirt encircling and spaced outwardly from said shelf, said skirt having an open top and a bottom, said shelf being movable from a position adjacent said bottom of said skirt to a position spaced below said top, at least two freely rotatable wheels supporting said cart, and a handle for guiding said cart.

9. The cart of claim 8 wherein said rod slides vertically within said housing, said cart further comprises a fluid power means for selectively controlling the introduction of fluid into and withdrawal of fluid from said housing to cause said rod to selectively be raised and lowered.

10. The cart of claim 9 wherein said fluid power means includes a fluid container, pump means for supplying fluid to said container, a conduit for supplying fluid from said container to said housing adjacent its bottom.

11. The cart of claim 8 further comprising a coil spring contained in said housing below said rod, said spring being sized and arranged to maintain said shelf spacedly below said top of said skirt when no load rests on said shelf and to allow said shelf to be positioned adjacent said bottom of said skirt when said shelf is loaded with a predetermined load.

12. The cart of claim 8 wherein said rod is threaded, a threaded collar engages said threaded rod, said collar supporting said shelf, and a gear means for rotating said rod about its vertical axis within said housing.

13. The cart of claim 12 further comprising a hand crank for selectively rotating said gear means to raise and lower said shelf.

14. The cart of claim 8 wherein said skirt includes a plurality of vertical hinges for collapsing said skirt, hinge means for folding said shelf against said housing along a horizontal axis, said skirt being collapsed against said shelf after folding thereof.

15. The cart of claim 8 wherein said skirt includes four thin vertical sheets forming a back wall, a front wall and a pair of side walls, a first pair of vertical hinge means respectively joining said side walls to said front wall, a second pair of spaced vertical hinge means located in each of said side walls spaced rearwardly from said front wall for folding said side walls inwardly between said front and back walls.

16. The cart of claim 15 further comprising another hinge means adjacent said housing and located transverse of said shelf for folding said shelf upwardly and permit collapsing of said side walls inwardly.

\* \* \* \* \*